United States Patent
Mittal et al.

(10) Patent No.: US 11,388,216 B2
(45) Date of Patent: Jul. 12, 2022

(54) SYSTEM AND METHOD FOR GENERATING API SCHEMAS FOR NETWORKED SERVICES

(71) Applicant: Volterra, Inc., Santa Clara, CA (US)

(72) Inventors: Devesh Mittal, Bangalore (IN); Gilles Roudiere, Sainte-Marie-Lapanouze (FR)

(73) Assignee: VOLTERRA, INC., Santa Clara, CA (US)

( * ) Notice: Subject to any disclaimer, the term of this patent is extended or adjusted under 35 U.S.C. 154(b) by 80 days.

(21) Appl. No.: 17/089,008

(22) Filed: Nov. 4, 2020

(65) Prior Publication Data

US 2021/0211486 A1 Jul. 8, 2021

Related U.S. Application Data

(63) Continuation-in-part of application No. 16/736,034, filed on Jan. 7, 2020, now Pat. No. 10,873,618.

(51) Int. Cl.
| | |
|---|---|
| *H04L 67/02* | (2022.01) |
| *G06K 9/62* | (2022.01) |
| *G06F 16/22* | (2019.01) |
| *G06F 16/215* | (2019.01) |
| *G06F 40/284* | (2020.01) |

(52) U.S. Cl.
CPC .......... *H04L 67/02* (2013.01); *G06F 16/215* (2019.01); *G06F 16/221* (2019.01); *G06F 40/284* (2020.01); *G06K 9/6269* (2013.01)

(58) Field of Classification Search
CPC ......... H04L 67/02; H04L 69/22; H04L 61/15; G06F 9/547
See application file for complete search history.

(56) References Cited

U.S. PATENT DOCUMENTS

| | | | |
|---|---|---|---|
| 10,331,695 B1 * | 6/2019 | Stickle | G06F 16/27 |
| 10,873,618 B1 * | 12/2020 | Mittal | H04L 61/15 |
| 2016/0043892 A1 * | 2/2016 | Hason | H04L 41/046 |
| | | | 709/223 |
| 2019/0043080 A1 * | 2/2019 | Buchalter | G06Q 30/0272 |

* cited by examiner

*Primary Examiner* — El Hadji M Sall
(74) *Attorney, Agent, or Firm* — Troutman Pepper Hamilton Sanders LLP (Rochester)

(57) ABSTRACT

A method and system for generating an API schema associated with at least one API Endpoint by inspecting network data traffic. Network data requests that have been successfully served by an application associated with at least one API endpoint are examined, parsed and processed to generate an API schema corresponding to the service associated with the at least one API Endpoint.

20 Claims, 7 Drawing Sheets

| Example 1 - Captured Samples | Resulting Schema |
|---|---|
| `[`<br>  `{`<br>    `"user": "Tony",`<br>    `"password": "123678"`<br>  `},`<br>  `{`<br>    `"user": "Hubert",`<br>    `"password": "954311"`<br>  `},`<br>  `{`<br>    `"user": "Jerome",`<br>    `"password": "431080",`<br>    `"token": "qsdfj"`<br>  `},`<br>  `{`<br>    `"user": "Catherine",`<br>    `"password": "121932"`<br>  `},`<br>  `{`<br>    `"user": "Jean-Yves",`<br>    `"password": "372910",`<br>    `"token": "qsdf-lkjasd"`<br>  `},`<br>  `{`<br>    `"user": "Robert",`<br>    `"password": "121932",`<br>    `"token": "fjik"`<br>  `},`<br>  `{`<br>    `"user": "Helene",`<br>    `"password": "744245",`<br>    `"token": "qsdfqsdf"`<br>  `},`<br>  `{`<br>    `"user": "Lorie",`<br>    `"password": "520553"`<br>  `},`<br>  `{`<br>    `"user": "Jeanne",`<br>    `"password": "752317",`<br>    `"token": "dsfjkkll"`<br>  `},`<br>  `{`<br>    `"user": "Yvette",`<br>    `"password": "367910",`<br>    `"token": "iapdjmlkjfds"`<br>  `}`<br>`]` | `{`<br>`"type": "array",`<br>`"items": {`<br>  `"type": "object",`<br>  `"required": [`<br>    `"password",`<br>    `"user"`<br>  `],`<br>  `"properties": {`<br>    `"token": {`<br>      `"type": "string",`<br>      `"description": "",`<br>      `"pattern": "[a-z0-9-]+"`<br>    `},`<br>    `"password": {`<br>      `"type": "string",`<br>      `"description": "Integer",`<br>      `"pattern": "-?\\d+"`<br>    `},`<br>    `"user": {`<br>      `"type": "string"`<br>    `}`<br>  `},`<br>  `"additionalItems": false`<br>`}`<br>`}` |

Fig. 7a

| Example 2 - Captured Samples | Resulting Schema |
|---|---|
| <pre>[<br>  {<br>    "couponData":<br>"MTIzNDU2Nzg5MC0xNTg3MzM3MjAwMDAw",<br>    "orderDetails": {<br>      "paymentId": "6761",<br>      "addressId": "7745",<br>      "deliveryMethodId": "1"<br>    }<br>  },<br>  {<br>    "couponData":<br>"MTIzNDU2Nzg5MC0xNTg3MzM3MjAwMDAw",<br>    "orderDetails": {<br>      "paymentId": "6776",<br>      "addressId": "7760",<br>      "deliveryMethodId": "1"<br>    }<br>  },<br>  {<br>    "couponData":<br>"MTIzNDU2Nzg5MC0xNTg3MzM3MjAwMDAw",<br>    "orderDetails": {<br>      "paymentId": "6783",<br>      "addressId": "7767",<br>      "deliveryMethodId": "1"<br>    }<br>  },<br>  {<br>    "couponData":<br>"MTIzNDU2Nzg5MC0xNTg3MzM3MjAwMDAw",<br>    "orderDetails": {<br>      "paymentId": "6769",<br>      "addressId": "7753",<br>      "deliveryMethodId": "1"<br>    }<br>  }<br>]</pre> | <pre>{<br>  "type": "object",<br>  "required": [<br>    "orderDetails",<br>    "couponData"<br>  ],<br>  "properties": {<br>    "orderDetails": {<br>      "type": "object",<br>      "required": [<br>        "addressId",<br>        "paymentId",<br>        "deliveryMethodId"<br>      ],<br>      "properties": {<br>        "addressId": {<br>          "type": "string",<br>          "description": "Integer",<br>          "pattern": "-?\\d+"<br>        },<br>        "paymentId": {<br>          "type": "string",<br>          "description": "Integer",<br>          "pattern": "-?\\d+"<br>        },<br>        "deliveryMethodId": {<br>          "type": "string",<br>          "description": "Integer",<br>          "pattern": "-?\\d+"<br>        }<br>      },<br>      "additionalItems": false<br>    },<br>    "couponData": {<br>      "type": "string"<br>    }<br>  },<br>  "additionalItems": false<br>}</pre> |

Fig. 7b

SYSTEM AND METHOD FOR GENERATING API SCHEMAS FOR NETWORKED SERVICES

RELATED APPLICATION DATA

This application is a Continuation-in-Part of application Ser. No. 16/736,034 filed on Jan. 7, 2020, the disclosure of which is incorporated herein by reference.

BACKGROUND OF THE INVENTION

The present application generally relates to Application Program Interfaces, or "APIs", for allowing software programs to communicate with each other, and more particularly, to a system and method for generating API schemas associated with a networked application based upon network traffic of requests made to the networked application.

Application Program Interfaces, or "APIs", are simply computer software code that allows two software programs to communicate with each other. APIs work by receiving requests for information from a web application or web server in accordance with the API structure and accomplishing a service in response to the request. For example, in HTTP based web applications, API Endpoints, usually defined as the unique tuple {URL, Method} form the most basic unit of commands for most modern web applications. Typically, to exchange data and commands, these API Endpoints use hierarchically structured data in the form of key-value pairs where a value can in-turn have more nested key-value pair structures. This key:value based data usually has a well-defined structure so that the business logic in the application can process the API commands and data efficiently. Both the client and server should be aware of the structure beforehand to enable the client to take advantage of the functionality implemented by these APIs. This well-defined structure is called the "schema" of that API. As noted above, all devices involved in API interactions must know the applicable API schema.

SUMMARY OF THE INVENTION

It is therefore an object of the present invention to generate the schema of an API endpoint based on network traffic calls to the API Endpoint. This and other objects of the present invention will become more apparent to those skilled in the art as the description of the present invention proceeds.

Briefly described, and in accordance with various embodiments thereof, a first aspect relates to a method for generating an API schema associated with at least one API Endpoint by inspecting network data traffic, comprising the steps of: receiving a plurality of network data requests data structures that use {ADDRESS, Method} format, and have been successfully served by an application associated with at least one API endpoint; parsing the network data request structures into strings of ordered elements; applying a mixed type distance function to corresponding pairs of elements in each of the network data request structures, wherein the mixed type distance function outputs a high distance value if the corresponding pair of elements are of different basic types and wherein the mixed type distance function outputs a low distance value if the corresponding pair of elements are of the same basic type; cluster the network data request data structures based on the results of the applying a mixed type distance function to create multiple network data request data structure data clusters; generating a cluster data schema for each network data request data structure data cluster; and combining the data cluster schemas in a recursive manner to generate an API schema corresponding to the service associated with the at least one API Endpoint.

A second aspect related to a computing system for generating an API schema associated with at least one API Endpoint by inspecting network data traffic, the system comprising: at least one computer processor; and at least one memory device operatively coupled to the at least one computing processor and having instructions stored thereon which, when executed by the at least one computing processor, cause the at least one computing processor to: parse a plurality of network data requests data structures into strings of ordered elements, wherein the network data requests data structures use {ADDRESS, Method} format, and have been successfully served by an application associated with at least one API endpoint; apply a mixed type distance function to corresponding pairs of elements in each of the network data request structures, wherein the mixed type distance function outputs a high distance value if the corresponding pair of elements are of different basic types and wherein the mixed type distance function outputs a low distance value if the corresponding pair of elements are of the same basic type; cluster the network data request data structures based on the results of the applying a mixed type distance function to create multiple network data request data structure data clusters; generate a cluster data schema for each network data request data structure data cluster; and combine the data cluster schemas in a recursive manner to generate an API schema corresponding to the service associated with the at least one API Endpoint.

Another aspect of the invention includes, wherein at least one of the elements is in the form of an array and wherein the method further comprises determining, for each of the arrays, whether the array is specified as (a) an ordered list of individually specified elements or, (b) and unordered list of similar elements.

The foregoing and other features and advantages of the present invention will become more apparent from the following more detailed description of particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein:

DETAILED DESCRIPTION

U.S. application Ser. No. 16/736,034 teaches how to discover the set of API Endpoints exposed by a web application by inspecting "Layer 7" (L7) network data traffic to dynamically generate a set of API Endpoints that are exposed by a web application that uses {URL, Method} format to uniquely identify a command action supported by the web application. The API Endpoints can be derived merely by inspecting HTTP request headers for requests that are known to have been successfully served by the application without any manual intervention or configuration. The method disclosed in U.S. application Ser. No. 16/736,034 successfully identifies dynamic components with high accuracy and results in a much more useful learned set of API Endpoints to be used for the purposes described above.

In an example, the web application hosted at www.reddit.com uses a unique ID, in the form of a seemingly random string, to identify a unique object. In the URL character string set forth below:

https://reddit.com/r/news/comments/8zo9or the characters "8zo9or" correspond to the unique ID, or random string. The properties related to such random string can appear later in the URL, as exemplified below:

https://reddit.com/r/news/comments/8zo9or/top/

A web-based application might have thousands of such unique IDs embedded in its URLs. However, these thousands of unique IDs do not really contribute any useful information, since the function performed at each such endpoint is the same. With regard to the above example, the abbreviated URL "reddit.com/r/news/comments/*" is a much more useful URL string when compared to the original URAL "reddit.com/r/news/comments/8zo9or/top/", for purposes of checking for an API Endpoint. The random string "8zo9or" is a dynamic part of the URL string. In accordance with the present invention, an API Endpoint mapper may take this into account by replacing this dynamic part of the URL with a predefined generic string, e.g., "DYN" or "*". Children directories of these dynamic parts of the URL (for example, the component "top" in the above example) might themselves be static, and should therefore be mapped to different API Endpoints.

Building upon the aforementioned example set forth above, assume that the following URLs are associated with the reddit.com website:

1) https://reddit.com/r/news/comments/8zo9or/top/2)
2) https://reddit.com/r/news/comments/8zo9or/controversial
3) https://reddit.com/r/news/comments/8zo9or/new An API Endpoint mapper following the principles of the present invention would convert each such URL into a corresponding collapsed URL shown in the table below:

r/news/comments/8zo9or/top/" can be split into the following components: "r"; "news"; "comments"; "8zo9or"; and "top". In this example, the component "8zo9or" is dynamic, while the other components are static. The present invention provides a highly accurate method of detecting the set of API Endpoints for websites that use URLs having dynamic URL components.

Raw URL strings that include L7 HTTP request headers using the {URL, Method} protocol are received an inputs, and a listing of API Endpoints, each defined as the tuple {CollapsedURL, Method} are derived as outputs. In this regard, the term "CollapsedURL" signifies a URL wherein dynamic component markers like the string "8zo9or" in the examples above are replaced by a generic placeholder, like "DYN".

Figure 1:
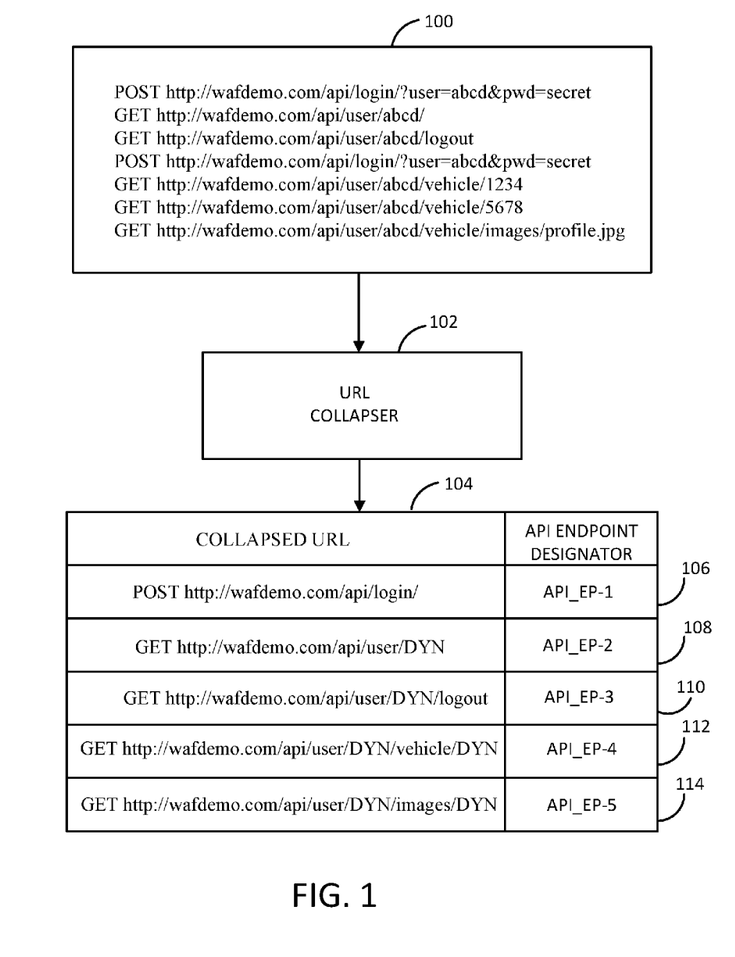
FIG. 1 is a flow diagram that summarily illustrates input information, in the form of raw {URL, Method} "tuples", for a number of requests processed by a server, as well as the corresponding output information in the form of a list of unique {CollapsedURL, Method} tuples.

FIG. 1 is a flow diagram that summarily illustrates input information, in the form of raw {URL, Method} "tuples", for a number of requests processed by a server, as well as the corresponding output information in the form of a list of unique {CollapsedURL, Method} tuples. The input requests shown in box 100 include the following:

POST http://wafdemo.com/api/login/?user=abcd&pwd=secret
GET http://wafdemo.com/api/user/abcd/GET http://wafdemo.com/api/user/abcd/logout
POST http://wafdemo.com/api/login/?user=abcd&pwd=secret
GET http://wafdemo.com/api/user/abcd/vehicle/1234
GET http://wafdemo.com/api/user/abcd/vehicle/5678
GET http://wafdemo.com/api/user/abcd/vehicle/images/profile.jpg In FIG. 1, box 102 ("URL Collapser") conceptually represents the work performed in accordance with the method and system of the present invention. Box 104 shows the results of the collapsed URL requests after consolidating the dynamic components of the original raw URL strings into a set of five collapsed endpoints. In box 104 of FIG. 1, row 106 covers both of the original POST requests. Row 108 covers the GET request http://wafdemo.com/api/user/abcd/. Row 110 covers the GET request and http://wafdemo.com/api/user/abcd/logout. Row 112 covers the two GET requests that end in the dynamic strings "1234" and "5678". Finally, row 114 covers the final GET request, http://wafdemo.com/api/user/abcd/vehicle/images/profile.jpg.

To help explain the manner in which dynamic components are identified in each URL string, it is first helpful to understand the concepts of component tree structure and dynamic component properties. These concepts will now be described.

Figure 2:
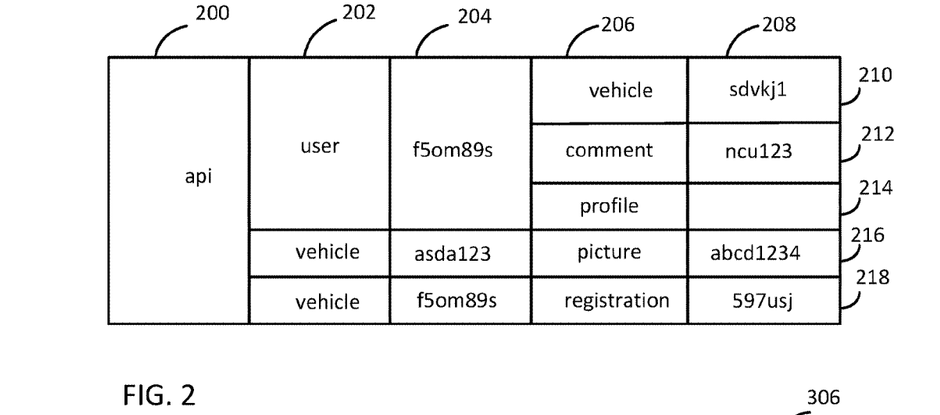
FIG. 2 illustrates an example of such a structure for a set of URLs.

A set of URLs can be represented as a tree structure made up of nodes where each node is a component in at least one of the URLs in the set. FIG. 2 illustrates an example of such a tree structure. In FIG. 2, leftmost column 200 represents the parent node "api", which is the node closest to the "root"

| Original URL | Collapsed URL |
|---|---|
| https://reddit.com/r/news/comments/8zo9or/top/ | https://reddit.com/r/news/comments/{DYN}/top/ |
| https://reddit.com/r/news/comments/8zo9or/controversial | https://reddit.com/r/news/comments/{DYN}/controversial |
| https://reddit.com/r/news/comments/8zo9or/new | https://reddit.com/r/news/comments/{DYN}/new |

URLs can be broken down into components by splitting the raw URL string using the forward-slash character "/". The resultant array of character strings are referred to herein as "components". For example, the URL "https://reddit.com/ of the tree, and which, in this instance, is common to all URL strings represented by the tree. Column 208, on the right side of FIG. 2, represents the "leaves" of the tree that are furthest from the root of the tree. Column 202 includes three "child" nodes relative to parent node 200. The first child node "user" spans three rows 210, 212 and 214. The second child node "vehicle" is set forth in row 216. The third child node, also named "vehicle", is set forth in row 218. Column 204 can be regarded as "grandchild" nodes relative to parent node column 200. However, it will be appreciated that the term "parent node" can be applied, for example, to the entries in column 202, in which case the entries of column 204 may be regarded as "child" nodes relative to the components shown in column 204, and the entries of column 206 may be regarded as "grandchild" nodes thereof.

The leaves in the tree (i.e., the components in column 208) shown in FIG. 2 map to the following set of URLs:
1. /api/user/f5om89s/vehicle/sdvkj1
2. /api/user/f5om89s/comment/ncu123
3. /api/user/f5om89s/profile
4. /api/vehicle/asda123/picture/abcd1234
5. /api/vehicle/f50m89s/registration/597usj When a set of URLs are represented as a tree structure, as discussed with regard to FIG. 2, the identification of dynamic components can be facilitated by the following set of rules:

1. The term "NumChildren" will be used herein to refer to the number of child nodes paired with a corresponding parent node. If NumChildren of a parent node is relatively large, then it is highly likely that the child-level of this parent node is dynamic.

2. The term "NumOccurrences" will be used herein to refer to the number of times, within a given period (say, within 24 hours), that a particular component appears within a request. If the NumOccurrences of a child component and its siblings is low, but the NumOccurrences for their respective parent component is high, then it is more likely that this child component and its siblings are dynamic.

3. In the world of statistical analysis, there is a tool known as the Jaccard similarity index (sometimes called the "Jaccard similarity coefficient") which compares the members of two sets of data to see which members are shared between the two sets, and which members are distinct. Thus, it is essentially a measure of the similarity of two sets of data, with a range from 0% to 100%; the higher the percentage, the more similar are the two sets being evaluated. If two grandchild node components (both sharing the same parent node) have a high Jaccard Similarity index, then it is more likely that the intermediate child node components are dynamic. Further specifics regarding use of the Jaccard similarity index are provided below. While Jaccard similarity is conventionally applied to two sets of data, the same concept may be applied to measure the similarity among three or more sets of data. As used herein, the term "Jaccard-like similarity" should be understood to refer to the application of conventional Jaccard similarity analysis applied to three or more sets of data.

4. Finally, if the various character sequences of a component and all its siblings, appear to be randomly generated, then it is likely that the component and its siblings are dynamic. The manner by which such random generation is detected is described in greater detail below.

Figure 3:
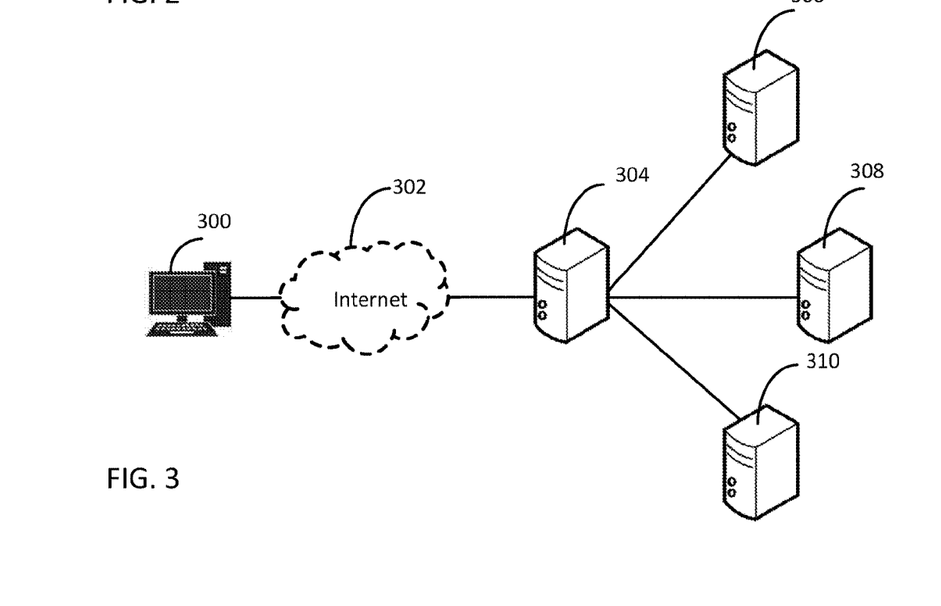
FIG. 3 a high level diagram of a typical proxy server deployment in accordance with disclosed embodiments.

Turning now to FIG. 3, a high level diagram of a typical proxy server deployment is shown. Client computer 300 is interconnected, via Internet 302, to proxy server 304. Proxy server 304 is, in turn, interconnected with three web application servers 306, 308 and 310. Proxy server 304 acts as a front-end for web applications and may optionally provide additional functionalities like load balancing, firewall protection, Bot detection, etc. Proxy server 304 receives all network data requests targeted toward web application servers 306, 308 and 310, and is able to inspect and extract the http headers for all requests that flow through proxy server 304. The method of the present invention may be performed within proxy server 304 or within a computer processor coupled thereto. Determination of API Endpoints within proxy server 304 can provide many benefits mentioned above, including data profiling and user behavior profiling, as well as serving as a useful tool for system administrators, and by security and site reliability engineering teams.

Figure 4:
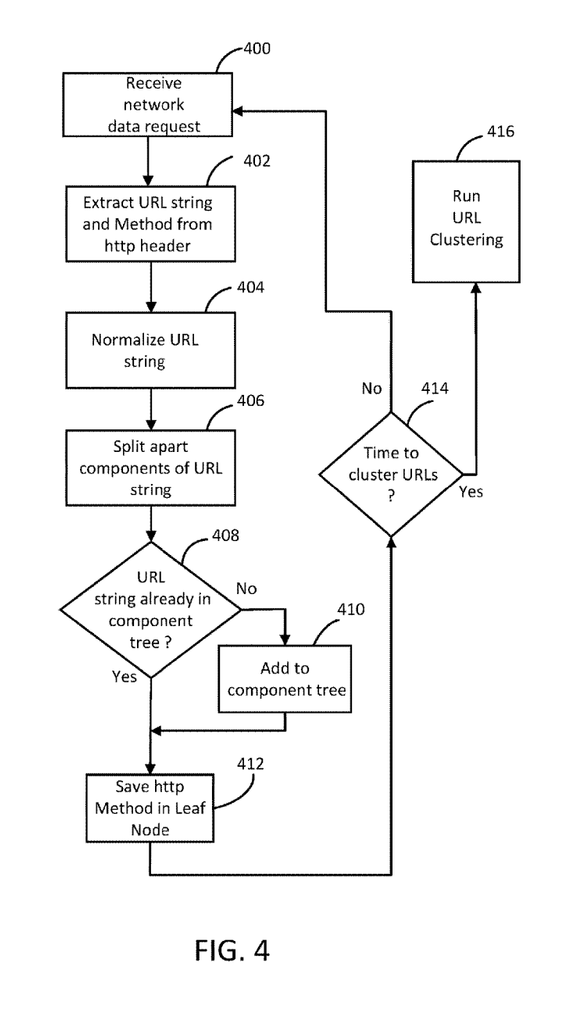
FIG. 4 is a flowchart illustrating the initial steps for processing http header request information in accordance with disclosed embodiments.

The initial steps for processing http header request information is shown in the flowchart of FIG. 4. At step 400, the next network data request is received by proxy server 304. At step 402, the URL string and Method are extracted from the http header information. For example, if the header of the request includes the "tuple" {URL, Method} in the form of GET http://wafdemo.com/api/user/abcd/, then the URL string wafdemo.com/api/user/abcd/is extracted, along with the Method "GET".

At step 404 of FIG. 4, the extracted URL string is "normalized" to remove any extra symbols and to resolve any path traversals. At step 406, the normalized URL string is split apart into its components by searching for the forward-slash character that separates such components; in the example above, the components are "api", "user" and "abcd". At step 408, it is determined whether the component tree table in which such URL strings are stored (see, for example, FIG. 2) already contains components arranged to form the current URL string; if not, the current combination of components is added to the component tree table, and control passes to step 412. If the current combination of components is already included in the component tree table, then control passes directly to step 412. At step 412, the "Method" extracted from the current request header (e.g., "GET") is saved in the form of metadata associated with the last, or "leaf" component node of the particular branch of the component tree to remember all Methods observed for a given URL string; in this regard, it will be recalled that API Endpoint identification includes a unique combination of URL and Method.

Still referring to FIG. 4, control passes from step 412 to decision step 414 to determine whether it is time to re-cluster the URL strings represented in the tree structure table. For example, one might decide to the re-cluster the entries in the tree component table for every ten (or alternatively, every hundred) insertions of new entries in such table. If the decision is "No", then control returns to step 400, and a new network data request is received. If the decision is "Yes", then a URL re-clustering process is performed in the manner described below. The logic for performing the steps described in FIG. 4 may be regarded as a "clustering module".

After the specified number of new component table insertions has been reached, the URL re-clustering process is performed. This process will now be described in conjunction with the flowchart of FIG. 5. Generally, the re-clustering process "walks" through the nodes of the URL component tree table and, at each node which has children, a determination is made whether that node's children are dynamic or not using the algorithm summarized in FIG. 5.

Figure 5:
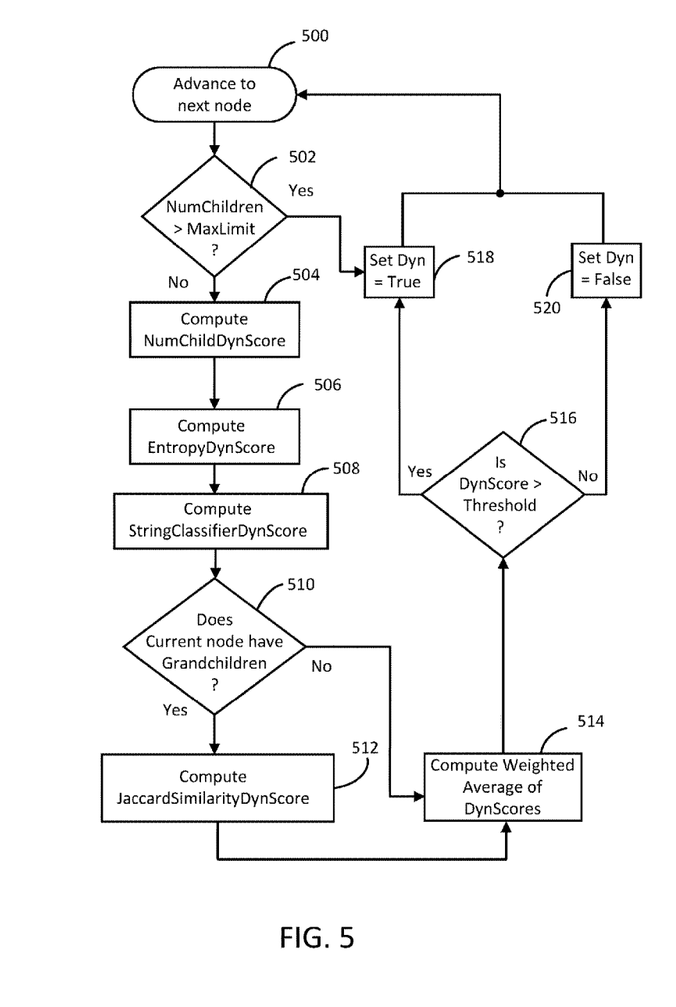
FIG. 5 is a flowchart of a URL clustering process in accordance with disclosed embodiments.

Referring now to FIG. 5, the process begins at step 500 by examining the first parent node in the tree structure table. At step 502, the number of child component nodes (NumChildren) is computed for the selected parent node. If NumChildren is greater than a specified number of children (MaxLimit), then control passes to block 518, and the child nodes are determined to be dynamic. This is because a parent node that has an exceptionally high number of children indicates that the child level of this parent node is dynamic.

If step 502 determines that NumChildren does not exceed MaxLimit, then control passes to step 504 for computation of a NumChildrenDynScore. Dynamic components tend to be much larger in number than non-dynamic components. To find parent nodes that have much larger number of child components than other nodes, a so-called Z-Score based method may be used. A "Z-score" (aka a "standard score") indicates how many standard deviations an element is from the mean. A z-score can be calculated as $z=(X-\mu)/\sigma$ where z is the z-score, X is the value of the element, $\mu$ is the population mean, and $\sigma$ is the standard deviation. For additional information, see "Statistics How To" at:

https://www.statisticshowto.datasciencecentral.com/probability-and-statistics/z-score/

When computing the Z-score, a NumChildMean and NumChildSTD (standard deviation) is calculated for each parent node in the tree. On visiting a node, the node's children are compared with other nodes in the tree using its Z-Score. The higher the Z-Score, the higher are the chances that the node is dynamic. After computing the mean value NumChildMean and standard deviation value NumChildSTD, the Z-score can be computed according to the formula:

Z-Score=(NumChild−NumChildMean)/NumChildSTD.

This Z-score is then used as the NumChildDynScore in step 504.

Control then passes to step 506 for computing an EntropyDynScore. The EntropyDynScore considers the number of occurrences over a predetermined period of time (e.g., in a set of access logs) of parent node components versus associated child node components. For example, in an earlier case shown in FIG. 1, two similar GET requests were set forth, namely, GET http://wafdemo.com/api/user/abcd/vehicle/1234
GET http://wafdemo.com/api/user/abcd/vehicle/5678

If the parent node being analyzed is the static component "vehicle", and the dynamic child node components are "1234" and "5678", then the component "vehicle" will typically have a far greater number of occurrences per unit time than either "1234" or "5678". In addition, in a case where the child components are dynamic, it is more likely that the occurrences of such dynamic components per unit of time will be more evenly distributed (compared to each other) than for non-dynamic components. The degree to which the number of occurrences is evenly distributed among such child components can be gauged by measuring the entropy of the distribution of occurrences across such child components. The more equal the distribution of occurrences among the child nodes, the more likely it is that such child components are dynamic. Computation of the EntropyDynScore first requires computation of Entropy, along with mean values and standard deviation values for Entropy. Entropy can be calculated in accordance with the following formula:

$$H(X) = -\sum_{i=1}^{n} p_i \log_2 p_i$$

Where H(X) is a measure of the entropy for an event X with n possible outcomes and probabilities p_1, . . . , p_n. Further details are provided at "Entropy is a measure of uncertainty", by Sebastian Kwiatkowski, *Toward Data Science*, Oct. 6, 2018, found at:

https://towardsdatascience.com/entropy-is-a-measure-of-uncertainty-e2c000301c2c.

After computing the Entropy for each child node, and computing the mean value EntropyMean and standard deviation value EntropyStd, the EntropyDyn score can be computed according to the formula:

EntropyDynScore=[(NumAccess/NumChild)−EntropyMean]/EntropyStd wherein NumAccess is the number of times a URL with a particular parent node component was accessed (i.e., the number of occurrences of this parent node component in network traffic within a predetermined time); and NumChild is the number of different child node components associated with such particular parent node.

Still referring to FIG. 5, control then passes from step 506 to step 508 4 for computation of a StringClassifierDynScore. Typically, dynamic components of URL path strings are randomly-generated strings of characters and/or integers. A so-called RNN LSTM based string classifier may be used to classify the text of child node components to predict if they are dynamic components or not. RNN LSTM is a deep neural networks-based technique to train classifiers, and which can thereafter classify a string of characters after being trained with large corpus of labeled training samples. In the present case, a two-class set of training data, labeled as either "dynamic" or "not dynamic", is used to train the classifier. The trained classifier then processes the string of characters that makes up a child component (and all of its siblings) to determine if they are dynamic or not dynamic. Further details regarding RNN LSTM classifiers are provided at "Understanding LSTM Networks", *Colah's Blog*, posted Aug. 27, 2015, at:

https://colah.github.io/posts/2015-08-Understanding-LSTMs/ and "The Unreasonable Effectiveness of Recurrent Neural Networks", *Andrej Karpathy Blog*, posted May 21, 2015, at:

http://karpathy.github.io/2015/05/21/rnn-effectiveness/

Such string classifiers render predictions by providing a score between the values 0 and 1, with "0" being non-dynamic and "1" being dynamic. The string classifier is run on all child node character strings. Then the value NumDynChildNodes is computed wherein NumDynChildNodes equals the total number of child nodes wherein the string classifier prediction score is greater than 0.95. Next, an average is calculated to get the average score for all child nodes of a particular parent node, as set forth below:

StringClassifiedDynScore=NumDynChildNodes/NumChild

Where NumChild is the number of child nodes associated with the parent node under study. The average computed above is used as the StringClassifiedDynScore.

Control then passes from step 508 to decision diamond 510 to determine whether, for a given parent node under study, its child nodes have child nodes of their own, i.e., the parent node under study has grandchild nodes. If there are no grandchild components, then step 512 is bypassed. If there are grandchild components, then control passes to step 512 for computing a JaccardSimilarityDynScore. The theoretical basis for step 512 is that, where a set of child nodes are dynamic, the grandchildren components of that set of child nodes will typically be very similar to each other. Accordingly, for each child node associated with a parent node under study, a set of grandchild component character strings is compiled. A Jaccard-like similarity index is then computed comparing the similarity (or non-similarity) of the sets of grandchild component strings associated with such child nodes; a relatively high Jaccard-like similarity index indicates that the intermediate child nodes, located intermediate the parent node and the grandchild nodes, are dynamic.

The Jaccard similarity index can be expressed, when comparing two sets of data, as a formula as set forth below:

$$\text{Jaccard Similarity index} = [NB/TM] \times 100,$$

wherein NB is the number of data members that appear in both data sets being compared; wherein TM is the total number of distinct data members that appear in either, or both, of such data sets being compared; and wherein the result is expressed as a percentage. This resulting percentage indicates how similar (or how different) the two data sets are to each other. For example, if two data sets, each containing 100 members, were identical to each other, then NB=100, TM=100, and the result=100%. As another example, if two data sets, each containing 100 members, had no members in common, then NB=0, TM=200, and the result=0%. As a final example, if two data sets each contain 100 members, and 50 members appeared within both data sets, then NB=50, TM=150 (i.e., 50 unique members in the first data set, 50 unique members in the second data set, and 50 common members shared by both data sets), and the result is 33.3. Once again, the higher the resulting percentage, the more similar are the two data sets to each other. Although this example uses two sets of data, the same concept may be applied to can be extended to three or more sets of data, and such application is termed Jaccard-like similarity herein. While Jaccard similarity is one type of statistical tool that may be used to compare the similarities and differences as between sets of data, other comparison tools known to those skilled in the art may also be used.

Still referring to step 512 of FIG. 5, a JaccardSimilarityDynScore is computed covering all grandchildren components of each parent node according to the following formula:

$$\text{(Intersection of all grandchildren components)} / \text{(Union of all grandchildren components)}.$$

The result of the expression above is used as the JaccardSimilarityDynScore for the children of the parent node under study. The higher the JaccardSimilarityDynScore for a particular parent node under study, the more likely it is that the child node components are dynamic.

Control then passes to step 514 where a weighted average, called "DynScore", is calculated and compared to a threshold to determine that the node's children are dynamic components, and hence, that such child nodes should be collapsed with a sub-tree merge operation. The DynScore can be expressed as follows:

$$\text{DynScore} = W1 \times \text{NumChildDynScore} + W2 \times \text{EntropyDynScore} + W3 \times \text{StringClassifierDynScore} + W4 \times \text{JaccardSimilarityDynScore},$$

where W1, W2, W3 and W4 are weighting factors used to scale the individual scores to be comparable to each other. At step 516, the overall DynScore is compared to a threshold value, and if the DynScore exceeds the threshold value, then the group of child components under evaluation is deemed to be dynamic; if not, then the group of child components under evaluation is deemed not to be dynamic. Control passes back to step 500, and the next node in the tree structure table is evaluated in the same manner.

In the embodiment described in FIG. 5, the DynScore is affected by each of the four component scores described above, and in combination, such component scores collectively provide a highly reliable indication of nodes being either dynamic or not dynamic. However, those skilled in the art will appreciate that one or more of such component scores may be omitted while continuing to accurately predict whether component nodes are dynamic or not dynamic.

If a parent node's children are determined to be dynamic, then a node collapse operation is performed within the node tree structure table such that all sub-trees of this node's child nodes are merged into a single sub-tree, and the dynamic node of this single sub-tree is assigned a generic designator, e.g., "DYN". This has the effect of replacing a number of child node sub-trees with a single dynamic component child node sub-tree. After the tree collapse operations are completed, the path to each leaf node represents a collapsed URL. At this leaf node, more metadata about this collapsed URL is stored, including the HTTP Method combinations associated with the collapsed URL string. The resulting component tree table provides the set of learned API Endpoints as identified by the resulting {CollapsedURL, Method} combinations.

The resulting set of API Endpoints provides a wealth of information that may be used to profile data usage, user behavior, provide security information, aid in preventing malevolent threats, detect errors associated with web applications and facilitate capacity planning. As noted above, to exchange data and commands, API Endpoints typically use hierarchically structured data in the form of key-value pairs where a value can in-turn have more nested key-value pair structures. This key:value based data usually has a well-defined structure, the schema, so that the business logic in the application can process the API commands and data efficiently. All communicating devices must be aware of the schema beforehand to enable the functionality implemented by these APIs.

In another embodiment, the networked computing system of FIG. 3 can be used to determine, i.e. "learn", the schema of API Endpoints exposed by a web application merely from inspecting traffic. Once the schema of API Endpoints is learned it can be used to interact with the service. Learning the schema of API Endpoints exposed by a web application merely from inspecting traffic has a huge range of applications, such as data profiling and user behavior profiling in web application firewalls. Additionally, this is of immense benefit as an app observability tool for system admins. Once the schema of API Endpoints is learned it can be used to profile and create other useful information about the application like typical data exchanged by these APIs, whether this API uses any Personally Identifiable Information which can act like security and business intelligence insights to be consumed by business, security and site reliability engineering teams.

The second disclosed embodiment is a method to inspect L7 traffic and dynamically learn the schema of API Endpoints exposed by a web application that uses, for example, the {URL, Method} semantics to uniquely identify a command action supported by the web application. The second disclosed embodiment can be accomplished by a networked computing system, such as the computing system of FIG. 3. This embodiment uses the identified API endpoints of the first embodiment (or any other known API endpoints of a service) and learns the schema of each API Endpoint based on network requests to the endpoint.

Figure 6:
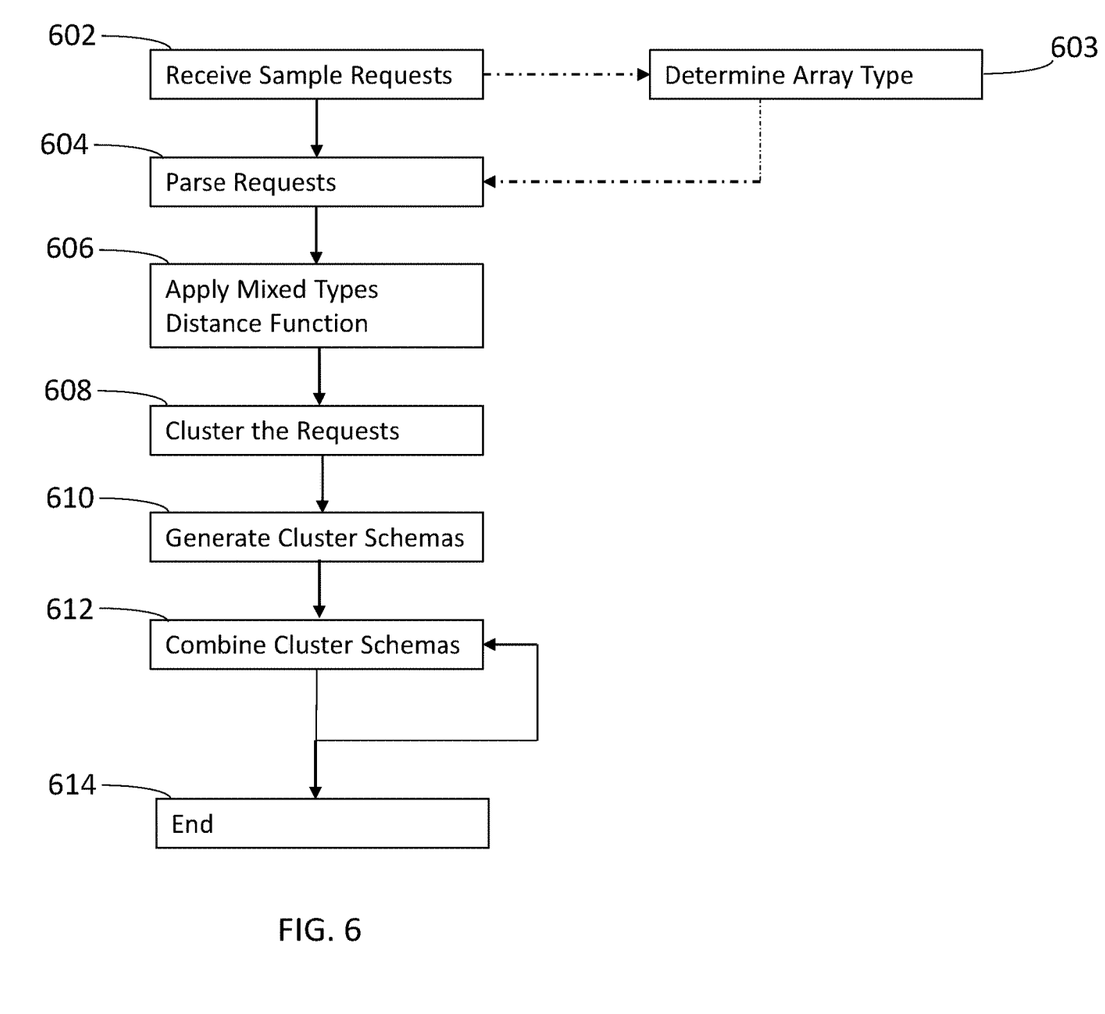
FIG. 6 is a flowchart of a method for learning an API schema in accordance with disclosed embodiments.

As illustrated in FIG. 6. The learning is accomplished by inspecting sample requests, such as HTTP requests, that are known to have been successfully served by the application without any manual intervention or configuration. The input to the system can come from in-line Deep Packet Inspection, or offline logs or packet captures generated by typical web servers or proxy servers which are received at step 602. The request headers and body are parsed at step 604.

To learn a schema of an API Endpoint, two technical problems must be resolved:
Identify groups of the different kinds of structures present in the input data examples; and
Combine the different groups to generate a single output schema definition.

The input, i.e. the sample requests, can be in (but are not limited to) the following formats: JavaScript Object Notation (JSON), Extensible Markup Language (XML), and/or x-www-form-urlencoded. JSON is an open standard file and data interchange format, that uses human-readable text to store and transmit data objects consisting of attribute-value pairs and array data types (or any other serializable value). XML is a markup language that defines a set of rules for encoding documents in a format that is both human-readable and machine-readable and is defined by the World Wide Web Consortium's XML 1.0 Specification of 1998 and several other related specifications. Finally, x-www-form-urlencoded is the default encoding type for the HTML Form post submission. These are all common formats in which HTTP-based APIs exchange hierarchically structured data. However, embodiments are not limited to these formats. In fact, the solution can be applied to any format that can be parsed into a canonical form of a hierarchical key-value structure.

Specific examples are discussed in the context of creating JSON schemas out of JSON examples. As any data format can be converted to JSON, the JSON schema standard specification can be used to cover many other formats. For example, as they consist of a set of key/value pairs, encoded HTTP forms (either as GET requests URL parameters or inside POST request bodies), can be trivially transformed into JSON objects. Conversion from any format will aim at preserving as much as possible the original structure of the data. Even if this is not a requirement, this keeps validating a data point over a schema significantly more useful, as each field of the original data is individually described in the produced schema. The embodiments create, out of a set of examples, a schema able to summarize all examples in the set. This operation is run recursively as the array and object JSON types might also have children, which would then need to be specified too.

A preprocessing step 603 can be executed to determine how to handle samples that are JSON arrays. The purpose of the preprocessing is to determine whether any JSON arrays are specified as tuples (an ordered list of individually specified elements) or as lists (an unordered list of similar elements). This is done by comparing each JSON sample array to all other arrays in the set with a distance function and averaging the results. This distance is referred to as "tuple distance" herein, as it is used to compare two tuples. If the computed average distance is under a specified threshold, the algorithm decides that the arrays in the JSON samples test are more likely to be tuples than lists. An example of the tuple distance determination is set forth in detail below.

Once the preprocessing step is completed (if necessary), embodiments use a clustering algorithm, such as Density-based Spatial Clustering (DBSCAN), to classify JSON samples in different groups. DBSCAN is a density-based clustering non-parametric algorithm: given a set of points in some space, it groups together points that are closely packed together (points with many nearby neighbors), marking as outliers points that lie alone in low-density regions (whose nearest neighbors are too far away). DBSCAN is one of the most common data clustering algorithms. At step 606, a distance function is applied to the elements of the samples. In one example, the embodiments apply DBSCAN with a custom distance function which always returns a value between 0 and 1. This distance is referred to herein as the "mixed types distance." The mixed type distance can be determined based on the following algorithm:

If the two elements are of different types (objects, arrays, integers, real numbers, strings, booleans or null values) the function returns 1. This forces the DBSCAN algorithm to always separate objects from different types.

If two elements share the same basic type, the distance function returns 0. Basic types are integers, real numbers, strings, booleans or null values. This step causes DBSCAN to group together elements sharing the same basic type.

If the elements are both arrays, what the distance function returns depends on whether the preprocessing decided to handle arrays as tuples or as lists. For each case, the distance function returns either the result of the "tuple distance" or the "list distance":

Tuple distance: This distance computes the average element-wise mixed types distance between the two arrays. If the two arrays' lengths are different, the tuple distance considers each extra element as if it was completely different from the one not present in the other array. Consequently, it adds a value of 1 in the computation of the average element-wise distance.

If both the arrays are empty, the tuple distance returns 0.5.

List distance: This distance computes, for each element of one list, the minimum mixed types distance to any one from all the elements contained in the other list. It then returns the average of those computed distances.

If the elements are both JSON objects, the distance function returns the Jaccard distance between the set of keys from each object.

Once DBSCAN is applied, the examples are clustered at step 608 and each cluster of examples is specified with a dedicated JSON schema at step 610. Outliers (as DBSCAN may create), are each specified with their own schema too. The schemas are then combined in a recursive manner at step 612, to build a schema validating the entire set of examples. If more than one JSON schema has to be produced, those are combined in an "anyOf" field, as JSON schema standard specifies. As is well known, to validate against "anyOf", the given data must be valid against any (one or more) of the given subschemas. For each schema to be created, the algorithm specifies more or less fields of the JSON schema depending on the type of the elements to be specified. Those fields are detailed in the following paragraphs.

For all basic types but strings (integers, real numbers, booleans and null values), only the type of the elements in the cluster is specified by filling in the "type" field. As an example, a cluster containing integers will have its schema's "type" field set to "integer":

```
{
    "type": "integer",
}
```

For some types, additional processing can be accomplished. Strings specifications may have an additional "pattern" field indicating a string has to validate among the given regular expression. To identify such a pattern, a set of common regular expressions can be defined. For each defined regular expression, it is checked if all strings to be specified validate among this expression. If one expression validates all strings, its defining pattern is added in the "pattern" field of the schema, and a description of the validated pattern is added to the "description" field. For example, a JSON schema like the one below can be produced:

```
{
    "type": "string",
    "pattern": ".+@.+",
    "description":"Email"
}
```

Depending whether arrays are detected as tuples or as lists, the JSON schema specification produced is different. If the arrays have to be specified as lists, the "items" field is set to a JSON object. It's value is a JSON schema built from the set of all elements present in all arrays of the set. The algorithm recursively uses the schema inference processes on this built set. This builds a schema similar to the following:

```
{
    "type": "array",
    "items": <JSON schema for possible items in the array>,
}
```

If the arrays have to be specified as tuples, elements are specified per-index in the tuple. The "items" field is thus set to an array where the n-th element in a schema specifying the n-th element in the tuple. If not all example arrays are of the same length, only a number of elements corresponding to the minimum length found amongst all example arrays is specified in the "items" array. The remaining elements are specified in the "additionalItems" array. If all example arrays are of the same length (and thus there are no additional items to specify), the "additionalItems" field is set to False, as show below.

```
{
    "type": "array",
    "items": [
<JSON schema for possible items at position 0>,
<JSON schema for possible items at position 1>,
...
    ],
    "additionalItems": <JSON schema for additional items in the array>
}
```

As JSON objects are a set of key/value pairs, their specification consists in assigning a schema to each possible key. To do so, the embodiment gathers the keys in the set of the JSON objects to specify and sort them according to several criteria:
  If a key is present in all examples, then it is a required key,
  If a key is present more often than a given ratio min presence, then it is an optional key,
  Otherwise, the key is an additional one.
In the produced JSON schema, both the required and optional keys are specified individually, which means all example values assigned to a given key are specified together. Those specifications are built, per-key, in a "properties" field. The list of required properties are added as an array assigned to a "required" field. All other values assigned to additional keys are specified in an "additionalItems" field.

Application of these rules leads to a schema as set forth below:

```
{
    "type": "object",
    "required" : ["key1", "key3",...]
    "properties": {
"key1" : <JSON schema for possible items assigned to "key1">,
"key2" : <JSON schema for possible items assigned to "key2">,
"key3" : <JSON schema for possible items assigned to "key3">,
...
    },
    "additionalItems": <JSON schema for additional items assigned to additional key>
}
```

This process is repeated for examples collected for all API endpoints and a combined documentation is created. The process ends at 614. Swagger is a popular API documentation format and it resembles the JSON schema specification very closely. Once the JSON schema is learned, the system is able to transform that into a Swagger specification in a known manner which can be easily parsed by API documentation tools.

Figure 7A:
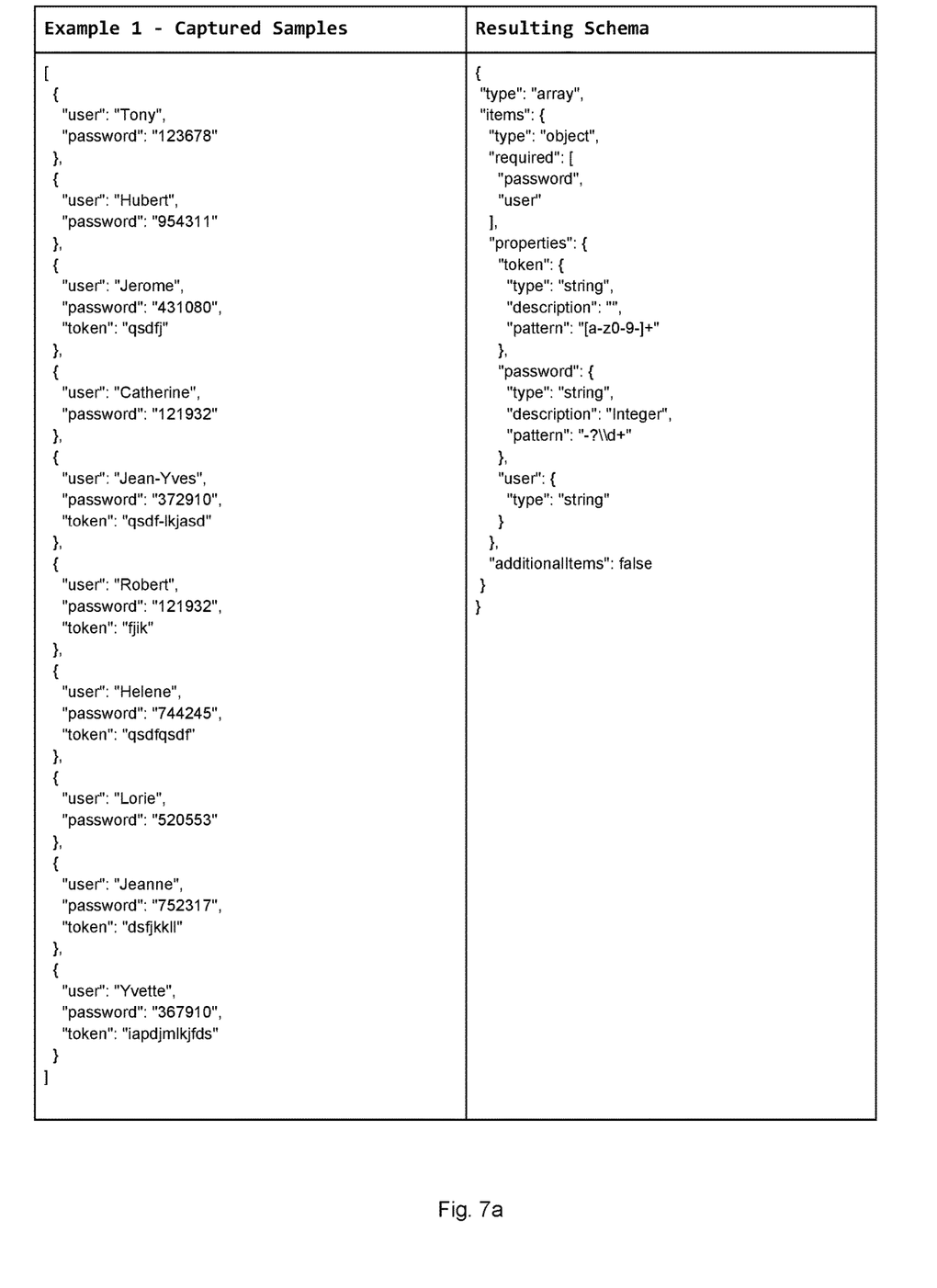
FIGS. 7a and 7b are examples of sample requests used as inputs and corresponding learned schemas.
Figure 7B:
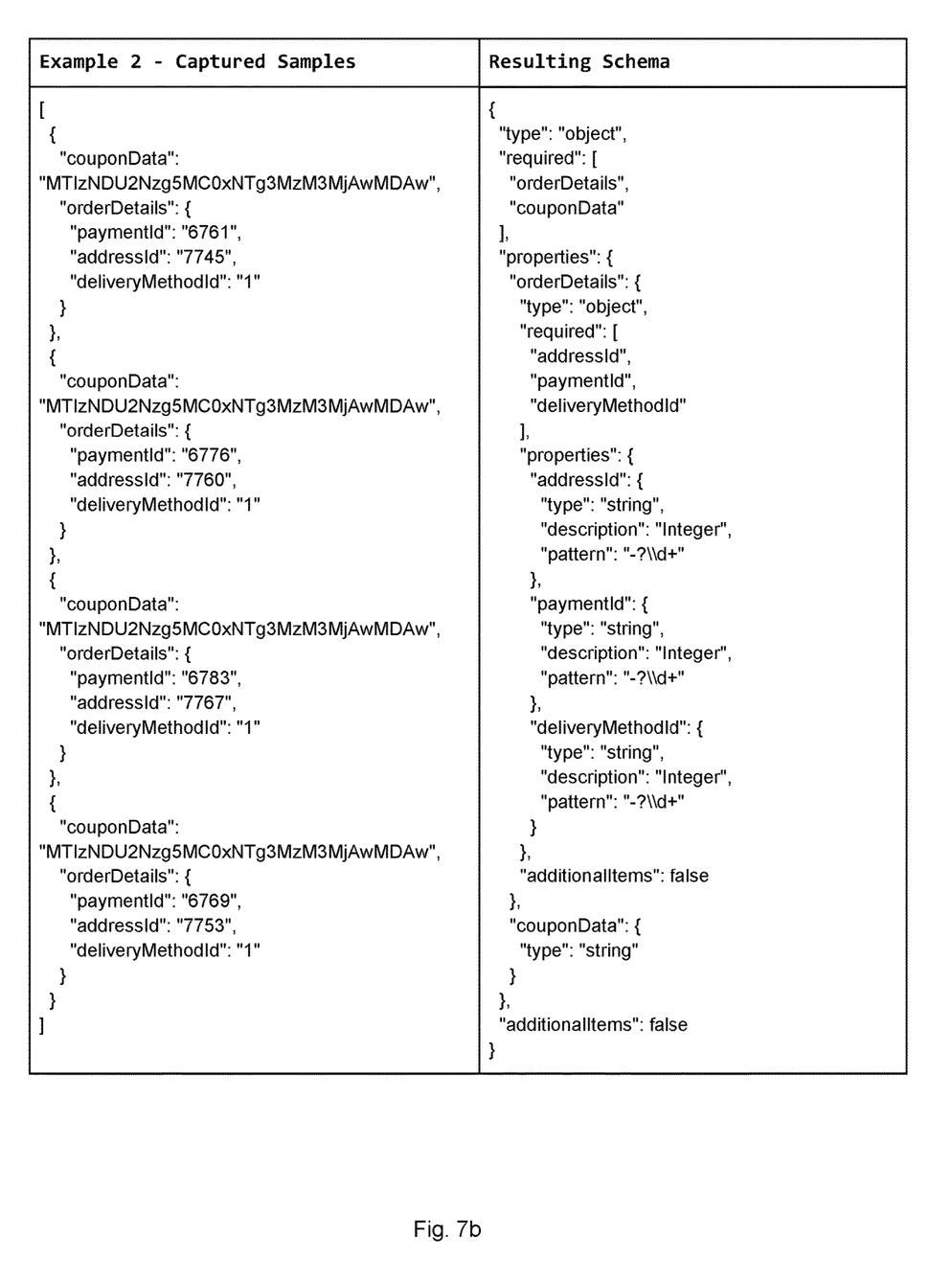

FIGS. 7a and 7b illustrate examples of captured sample requests (left column) and the corresponding learned schemas (right column) resulting from applying the disclosed embodiments. It can be seen that the learned schemas validate each element of the samples.

Computing systems referred to herein, including without limitation proxy servers, can comprise an integrated circuit, a microprocessor, a personal computer, a server, a distributed computing system, a communication device, a network device, a firewall, a proxy server, a web server, an application gateway, a stateful connection manager, and/or various combinations of the same. Processors referred to herein can comprise microprocessors, for example. Chipsets referred to herein can comprise one or more integrated circuits, and memories and storage referred to herein can comprise volatile and/or non-volatile memory such as random access memory (RAM), dynamic random access memory (DRAM), static random access memory (SRAM), magnetic media, optical media, nano-media, a hard drive, a compact disk, a digital versatile disc (DVD), and/or other devices configured for storing analog or digital information, such as in a database. As such, it will be appreciated that the various examples of logic noted above can comprise hardware, firmware, or software stored on a computer-readable medium, or combinations thereof.

As used herein, the term "logic" or "logic element" may refer to a server or to a separate computing system coupled with a server. Such logic may include a computer processor, associated storage, and associated input and output ports. The various examples of logic noted herein can comprise hardware, firmware, or software stored on a computer-readable medium, or combinations thereof. This logic may be implemented in an electronic device to produce a special purpose computing system. Computer-implemented steps of the methods noted herein can comprise a set of instructions stored on a computer-readable medium that when executed cause the computing system to perform the steps. A computer-readable medium, as used herein, refers only to non-transitory media, does not encompass transitory forms of signal transmission, and expressly excludes paper.

A computing system programmed to perform particular functions pursuant to instructions from program software is a special purpose computing system for performing those particular functions. Data that is manipulated by a special purpose computing system while performing those particular functions is at least electronically saved in buffers of the computing system, physically changing the special purpose computing system from one state to the next with each change to the stored data. Claims directed to methods herein are expressly limited to computer implemented embodiments thereof and expressly do not cover embodiments that can be performed purely mentally.

The absence of the term "means" from any claim should be understood as excluding that claim from being interpreted under Section 112(f) of the Patent Laws. As used in the claims of this application, "configured to" and "configured for" are not intended to invoke Section 112(f) of the Patent Laws.

Several embodiments are specifically illustrated and/or described herein to exemplify particular applications of the invention. These descriptions and drawings should not be considered in a limiting sense, as it is understood that the present invention is in no way limited to only the disclosed embodiments. It will be appreciated that various modifications or adaptations of the methods and or specific structures described herein may become apparent to those skilled in the art. All such modifications, adaptations, or variations are considered to be within the spirit and scope of the present invention, and within the scope of the appended claims.

We claim:

1. A method for generating an API schema associated with at least one API Endpoint by inspecting network data traffic, comprising the steps of:
   receiving a plurality of network data requests data structures that use {ADDRESS, Method} format, and have been successfully served by an application associated with at least one API endpoint;
   parsing the network data request structures into strings of ordered elements;
   applying a mixed type distance function to corresponding pairs of elements in each of the network data request structures, wherein the mixed type distance function outputs a high distance value if the corresponding pair of elements are of different basic types and wherein the mixed type distance function outputs a low distance value if the corresponding pair of elements are of the same basic type;
   clustering the network data request data structures based on the results of the applying a mixed type distance function to create multiple network data request data structure data clusters;
   generating a cluster data schema for each network data request data structure data cluster; and
   combining the data cluster schemas in a recursive manner to generate an API schema corresponding to the service associated with the at least one API Endpoint.

2. The method of claim 1 wherein at least one of the elements is in the form of an array and wherein the method further comprises determining, for each of the arrays, whether the array is specified as (a) an ordered list of individually specified elements or, (b) and unordered list of similar elements.

3. The method of claim 2, wherein if both elements in a corresponding pair of elements are arrays, the distance function returns the result of a tuple distance where the arrays are determined to bean ordered list of individually specified elements and the distance function returns a list distance where the arrays are an unordered list of similar elements wherein:
   the tuple distance is an average element-wise mixed types distance between the two arrays; and
   the list distance, the average of, for each element of one list, the minimum mixed types distance to any one from all the elements contained in the other list.

4. The method of claim 1, wherein the network data requests are web requests and the address is a URL.

5. The method of claim 4, wherein the network data request data structures are in JSON format.

6. The method of claim 1, wherein the high distance value is 1 and the low distance value is 0.

7. The method of claim 1, wherein the basic data types are at least one of objects, arrays, integers, real numbers, strings, Boolean, and null values.

8. The method of claim 1, wherein the data request data structures are received in real time from data packets transmitted over a network.

9. The method of claim 1, wherein the data request data structures are received from an offline access log generated by a network server.

10. The method of claim 1, wherein the clustering step comprises applying a density-based non-parametric clustering algorithm.

11. A computing system for generating an API schema associated with at least one API Endpoint by inspecting network data traffic, the system comprising:
    at least one computer processor; and
    at least one memory device operatively coupled to the at least one computing processor and having instructions stored thereon which, when executed by the at least one computing processor, cause the at least one computing processor to:
    parse a plurality of network data requests data structures into strings of ordered elements, wherein the network data requests data structures use {ADDRESS, Method} format, and have been successfully served by an application associated with at least one API endpoint;
    apply a mixed type distance function to corresponding pairs of elements in each of the network data request structures, wherein the mixed type distance function outputs a high distance value if the corresponding pair of elements are of different basic types and wherein the mixed type distance function outputs a low distance value if the corresponding pair of elements are of the same basic type;
    cluster the network data request data structures based on the results of the applying a mixed type distance function to create multiple network data request data structure data clusters;
    generate a cluster data schema for each network data request data structure data cluster; and
    combine the data cluster schemas in a recursive manner to generate an API schema corresponding to the service associated with the at least one API Endpoint.

12. The system of claim 11 wherein at least one of the elements is in the form of an array and wherein the at least one processor further determines, for each of the arrays, whether the array is specified as (a) an ordered list of individually specified elements or, (b) and unordered list of similar elements.

13. The system of claim 12, wherein if both elements in a corresponding pair of elements are arrays, the distance function returns the result of a tuple distance where the arrays are determined to bean ordered list of individually specified elements and the distance function returns a list distance where the arrays are an unordered list of similar elements wherein:

the tuple distance is an average element-wise mixed types distance between the two arrays; and the list distance, the average of, for each element of one list, the minimum mixed types distance to any one from all the elements contained in the other list.

14. The system of claim 11, wherein the network data requests are web requests and the address is a URL.

15. The system of claim 14, wherein the network data request data structures are in JSON format.

16. The system of claim 11, wherein the high distance value is 1 and the low distance value is 0.

17. The system of claim 11, wherein the basic data types are at least one of objects, arrays, integers, real numbers, strings, Boolean, and null values.

18. The system of claim 11, wherein the data request data structures are received in real time from data packets transmitted over a network.

19. The system of claim 11, wherein the data request data structures are received from an offline access log generated by a network server.

20. The system of claim 11, wherein the network data request data structures are clustered by applying a density-based non-parametric clustering algorithm.

* * * * *